(12) United States Patent
Bagheri

(10) Patent No.: US 7,881,999 B2
(45) Date of Patent: Feb. 1, 2011

(54) SYSTEM AND METHOD FOR GENERATING A REIMBURSEMENT REQUEST

(75) Inventor: Ramin Bagheri, Schwetzingen (DE)

(73) Assignee: SAP AG, Walldorf (DE)

( * ) Notice: Subject to any disclaimer, the term of this patent is extended or adjusted under 35 U.S.C. 154(b) by 556 days.

(21) Appl. No.: 11/319,511

(22) Filed: Dec. 29, 2005

(65) Prior Publication Data

US 2007/0156582 A1 Jul. 5, 2007

(51) Int. Cl.
*G06Q 40/00* (2006.01)
(52) U.S. Cl. .................................................. 705/35
(58) Field of Classification Search ............. 705/35–44
See application file for complete search history.

(56) References Cited

U.S. PATENT DOCUMENTS

| | | | | | |
|---|---|---|---|---|---|
| 5,977,973 | A | * | 11/1999 | Sobeski et al. | 715/798 |
| 6,161,103 | A | * | 12/2000 | Rauer et al. | 707/4 |
| 6,400,845 | B1 | * | 6/2002 | Volino | 382/176 |
| 6,631,512 | B1 | * | 10/2003 | Onyeabor | 717/100 |
| 7,627,843 | B2 | * | 12/2009 | Dozorets et al. | 716/5 |
| 2004/0122751 | A1 | * | 6/2004 | Kurtz et al. | 705/30 |
| 2004/0128168 | A1 | * | 7/2004 | Wyatt | 705/2 |
| 2004/0210479 | A1 | * | 10/2004 | Perkowski et al. | 705/14 |
| 2005/0033616 | A1 | | 2/2005 | Vavul et al. | |
| 2005/0049938 | A1 | * | 3/2005 | Venkiteswaran | 705/27 |
| 2005/0240524 | A1 | * | 10/2005 | Van De Van et al. | 705/40 |
| 2006/0080126 | A1 | * | 4/2006 | Greer et al. | 705/1 |
| 2007/0038663 | A1 | * | 2/2007 | Colando | 707/102 |

OTHER PUBLICATIONS

Brinksma, Ed, Tools and Algorithms for the Construction and Analysis of Systems, Springer, p. 70.*

* cited by examiner

*Primary Examiner*—Olabode Akintola
(74) *Attorney, Agent, or Firm*—Kenyon & Kenyon LLP

(57) ABSTRACT

In a reimbursement request workflow system and method, a processor may generate a reimbursement request by converting at least a selected portion of a purchase order request into the reimbursement request or by retrieving content provided by an external catalogue, extracting data from the retrieved content, and populating fields of a copy of a reimbursement request template copy with the extracted data or a portion thereof.

33 Claims, 7 Drawing Sheets

Home | Help | Settings | Support | Log off

Create Reimbursement Request

[Order] [Hold] [Check] [Change] [Display] [Delete] [Refresh]
[Download] [Upload]

Reimbursement Request Name: [USA Travel Confrence]  Number: [7600000178]

[Header Data] [Item Data]

Add Catalog Items

Find in Catalog [One Travel Catalog ⌄] [Start]

Item Overview

| ☐ | Item | Item Cat. | Description | Product | Product Category | Quantity | Gross Price |
|---|------|-----------|-------------|---------|------------------|----------|-------------|
| ☐ | 1 | Service | Flight Ticket FRA-LAX | | ⊕ Transportation | 1 Round trip ⌄ | 1200 |
| ☐ | 2 | Service | Hotel | | ⊕ Accomodation | 3 nights ⌄ | 650 |
| ☐ | 3 | Service | Rental car | | ⊕ Rentals | 3 days ⌄ | 250 |

[Add Items] [Renumber Items] [Propose Sources of Supply] [Duplicate Selected Positions]

[Submit]

FIG. 6

SYSTEM AND METHOD FOR GENERATING A REIMBURSEMENT REQUEST

BACKGROUND

People often incur expenses on behalf of an entity. For example, company employees often incur expenses in their performance of duties on behalf of the company. If an employee's expenditures on behalf of the company are approved by the company, for example, by someone of the company that has approval authority, e.g., a reimbursement administrator, the employee is reimbursed for the employee's expenditures. If an employee anticipates that the employee will incur an expense on behalf of the company, the employee typically requests approval for the expenditure prior to incurring the expense.

Computer applications are conventionally provided for managing a reimbursement workflow. In a conventional computer application for employee reimbursement workflow, the employee manually enters into a reimbursement request form information regarding the service(s) and/or product(s) for which the employee incurs an expense, and submits the form. For example, the employee may submit a form detailing previously incurred expenses or anticipated expenses. It is determined, either by someone of the company, e.g., the reimbursement administrator, or automatically by a processor according to predetermined rules, whether and to what extent the reimbursement request is to be approved. At an end of the workflow, the employee is reimbursed for approved expenses.

However, manual entry of the data by the employee to create a reimbursement request wastes time. Often such manual data entry results in mistakes, such as an incorrect quantity or price. Furthermore, conventional applications do not provide the employee with any direction to determine the nature of the products and services, and the vendors thereof, that are most often approved by the company. Accordingly, an employee who anticipates an incurred expense often performs numerous searches until the employee finds a product, service, and/or vendor that is approved by the reimbursement administrator. Numerous reimbursement requests may be submitted and rejected until the employee submits a reimbursement request for reimbursement approval of an anticipated expense incurred for an approved product and/or service, and an approved vendor thereof.

BRIEF DESCRIPTION OF THE DRAWINGS

FIG. 3 is a screenshot of an example vendor selection form according to an example embodiment of the present invention.

FIGS. 4a and 4b illustrates example displays for displaying a vendor selection form and a selected external catalogue, according to an example embodiment of the present invention.

FIG. 5 is a screenshot of an example reimbursement request according to an example embodiment of the present invention.

FIG. 6 is a screenshot of an example vendor selection form for generating a purchase order (P.O.) request according to an example embodiment of the present invention.

DETAILED DESCRIPTION

Embodiments of the present invention relate to a reimbursement workflow computer system and method that may retrieve expense related data from an external electronic catalogue and automatically create a reimbursement request based on the retrieved data. A person, e.g., an employee, may jump to the external catalogue from the reimbursement workflow computer system, browse the catalogue until data regarding a desired product and/or service is displayed, and instruct the reimbursement workflow system to import the data from the external catalogue.

Figure 1:
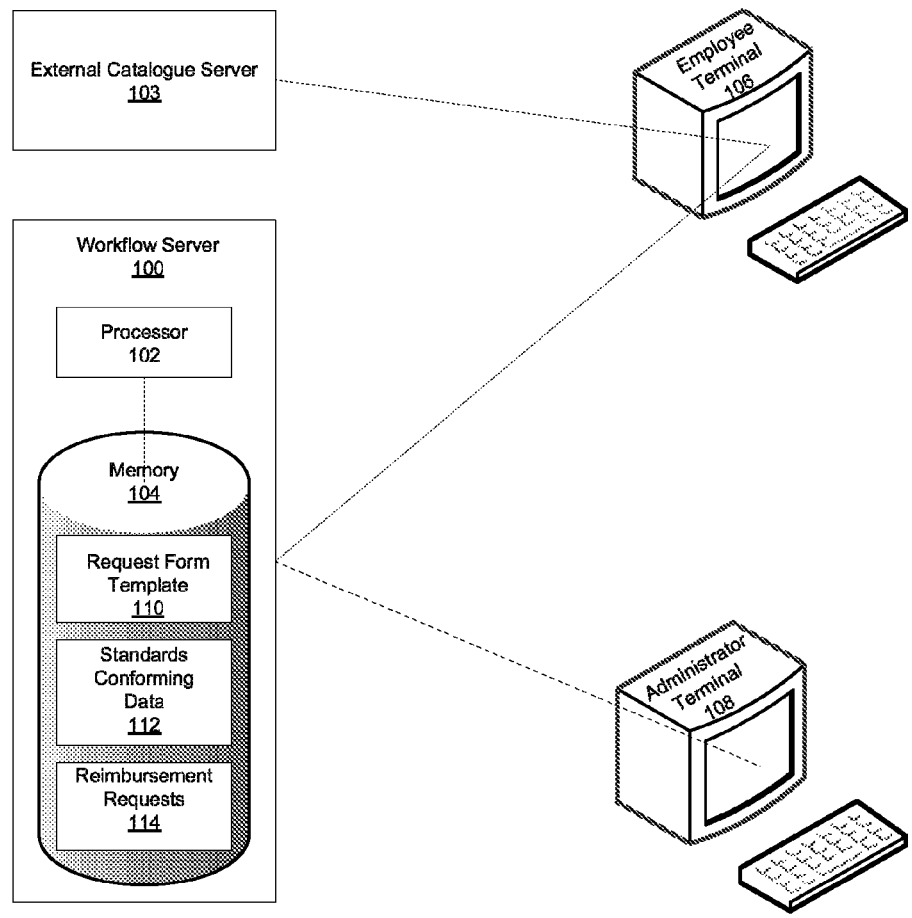
FIG. 1 is a block diagram that illustrates example components of a system according to an example embodiment of the present invention.

FIG. 1 is a block diagram that illustrates components of an exemplary system according to an embodiment of the present invention. A processor 102 at a workflow server 100 may generate a reimbursement request and may store the request in a memory 104. The processor 102 may generate the reimbursement request in response to instructions received from a user, for example an employee at an employee terminal 106. After generation of the reimbursement request, the request may be submitted for approval, for example by an administrator who may retrieve the request from the memory 104, e.g., via an administrator terminal 108.

The employee may access an external catalogue server 103 to browse an external catalogue at the external catalogue server 103. For example, the employee may enter or click on a Uniform Resource Locator (URL) address of the external catalogue. The URL may identify the external catalogue server 103 and the particular catalogue desired.

The browser may retrieve data of the external catalogue from the server 103 identified by the URL and may display the catalogue at the employee terminal 106. The employee may browse the catalogue in search for a product(s) and/or service(s) the employee determines is desired for purchase (or that has already been purchased) on behalf of the employee's employer, e.g., for performing the employee's duties. The desired product(s) and/or service(s) may be displayed in a web page at the employee terminal 106 when the employee finds the desired product(s) and/or service(s). For example, the employee may add the desired product(s) and/or services to a shopping cart of the external catalogue, which may be displayed.

After the employee accesses the workflow server 100 to log into the reimbursement workflow system, the employee may instruct the processor 102 to import data from the displayed page of the external catalogue that includes embedded data regarding the displayed product(s) and/or service(s) for purchase of which the employee desires generation of a reimbursement request. The embedded data may be, e.g., in the Hyper Text Markup Language (HTML), Extensible Markup Language (XML), or any other conventional markup language. In response to the instruction, the processor 102 may identify the product(s) and/or service(s) and related data displayed in the external catalogue page by analyzing the page's markup language. The processor 102 may populate fields of an electronic reimbursement request form with the identified data. For example, one or more reimbursement request form template(s) 110 may be stored in the memory 104. The template 110 may include standard text and unpopulated fields. For example, standard text may be, e.g., "Price:" and beside this text may be an unpopulated price field. To generate a new reimbursement request in response to the employee's instruction, the processor 102 may generate a copy of the template 110 and populate the fields of the copy with the data obtained from the external catalogue page. In one example embodiment of the present invention, different templates 110 may be used depending on the particular product(s) and/or service(s)

for which the request is generated, and/or depending on the particular catalogue (vendor) from which the data is retrieved. In one example embodiment, templates 110 may be combined to generate a single reimbursement request. For example, a first template 110 may be used for generating a reimbursement request that includes data relating to services that have been purchased or of which purchase is anticipated, and a second template 110 may be used for generating a reimbursement request that includes data relating to products that have been purchased or of which purchase is anticipated. If the reimbursement request to be generated is for both services and products, the processor 102 may combine the services template 110 and the products template 110 to generate a single reimbursement request.

Many electronic catalogue systems conform to standards such that their data tags may be recognized by other systems via an interface, e.g., an open catalogue interface (OCI). In an embodiment of the present invention, data 112 relating to the tags that may be used by catalogues that conform to such standards may be stored in the memory 104. The data 112 may map particular data tags or particular sets of data tags to particular fields in the templates 110. The processor 102 may identify the data or types of data in the external catalogue page by matching data tags in the external catalogue page to mapped data tags of the data 112. The processor 102 may determine the field in the reimbursement request form to which the matched data tag is mapped, and may populate that field. For example, a particular field may be associated with a particular data, such as hotel name. The field may be populated with data of the external catalogue that is associated with a data tag that identifies it as being a hotel name. Alternatively, or in addition, a particular field may be associated with a particular type of data, such as a product. The field may be populated with data of the external catalogue that is associated with a data tag that identifies it as being a product, rather than, e.g., a quantity or a price. It will be appreciated that the data tag need not explicitly identify the data as a product even according to the latter embodiment. For example, the data tag may identify the data as a hotel name, and the data 112 may map the data tag to a "product" category.

It will be appreciated that instead of mapping fields to data tags, the external catalogue data to be imported may itself be mapped to the fields to be populated. For example, the data 112 may include text strings to which the processor 102 may match the external catalogue data. The text strings may be mapped to the fields.

The generated reimbursement request may be stored in the memory 104. A user may access stored reimbursement requests 114. For example, the employee may open a stored reimbursement request 114 and may enter changes to the request 114. Such changes may be necessary, for example, where the employee determines that an additional product and/or service is required or if details regarding already requested products and/or services have been modified, e.g., where the employee determines that a greater quantity of an already requested item is required.

In an embodiment of the present invention, the processor 102 may determine whether and to what extent to grant the request. A rule set to which the processor 102 may refer may indicate whether and to what extent a request is to be granted. The rule set may include conditions on which the determinations are based. The conditions may differ depending on the requestor. For example, data may be stored in the memory 104 indicating a maximum amount or maximum percentage that may be reimbursed. In one embodiment, this data may differ depending on the particular employee requesting reimbursement. For example, each employee or employee type may be assigned a corresponding ID, and for each ID, a different set of data may be stored. For example, the data may indicate, based on the IDs, that a senior level employee of a company is to be reimbursed for 80% of the employee's expenses on behalf of the company, but that a junior-level employee is to be reimbursed for only 75% of the employee's expenses on behalf of the company, or vice versa. Additionally or alternatively, the data may differ depending on the product or service for expenditures of which an employee requests reimbursement. For example, the data may indicate that an employee is to be reimbursed for 100% of flight expenses, but for only 50% of expenditures for food during a business trip. It will be appreciated that the any number of criteria may be used for determining whether and to what extent a reimbursement request is to be granted. For each such criteria, data may be stored. The data relating to the criteria used for determining the extent to which a reimbursement request is to be granted may include identifications of data tags or particular data strings to be matched with data tags or data strings of a generated reimbursement request. The processor 102 may match data tags or data strings in the generated reimbursement request, to the reimbursement criteria data, and thereby determine the extent to which the request is to be granted. For example, a separate determination may be made for each individual item in the request.

Alternatively, or in addition, a reimbursement administrator, e.g., at an administrator terminal 108, may open the stored reimbursement request 114 and determine whether and to what extent to grant the request.

In one embodiment, information regarding the grant of the request may be entered into a field or fields in the request. For example, for each requested item, or for the request in totality, a sum to be reimbursed and/or a percentage of the expenditures that is to be reimbursed may be provided in the field(s) of the request. Alternatively, the employee may be contacted, e.g., via e-mail, to be informed of the request status. In one embodiment, after a request is closed indicating that no more changes will be entered, payment to the employee may be initiated automatically or manually in accordance with the determined or entered amount for which the employee is to be reimbursed.

It will be appreciated that FIG. 1 and its description is provided by way of example only. For example, the processor 102 and the memory 104 may be a local processor and memory of the terminal 106. For example, the terminal 106 may be a Personal Computer (PC), and the processor 102 and memory 104 may be a PC processor and PC memory of the PC 106. In addition, although FIG. 1 shows an employee terminal 106 and an administrator terminal 108, one may access the stored reimbursement requests 114 in the capacity of the employee and/or in the capacity of the administrator at a single terminal. For example, depending on log-in information entered when the user logs into the reimbursement workflow system, the processor 102 may determine the types of actions and access for which the user is authorized.

In an embodiment of the present invention, stored in the memory 104 may be data regarding particular vendors and their external catalogues. For example, it may be desirable for a business entity to limit its employees to particular vendors for procurement of certain products and/or services. Data may therefore be stored in the memory 104 that relates to catalogues of only approved vendors, or of only vendors that are most often approved. Such data may include for each external catalogue of an approved vendor an address, e.g., a URL, of the external catalogue. Furthermore, it may be desirable for the business entity to limit its employees to procurement of only certain products and/or services. Accordingly, the data 112 may be limited to only data tags relating to approved products and/or service, or to products and/or services that are most often approved. As is described in detail below, the data stored in the memory 104 may therefore be used to help guide an employee to determine the products and services, and the vendors thereof, that are most often approved by the company, and to create a reimbursement request for only those products and/or services from only those vendors.

It will be appreciated that data may be associated with more than one data tag. A first data tag may identify the data as belonging to a particular category, and a second data tag may more precisely identify the data. For example, a first data tag may identify the data as a referring to a service, and a second data tag may identify the data as referring to providing a guided scenic tour. In an embodiment of the present invention, a field to be populated with the data may be determined based on a mapping of the field to the first data tag, and whether populating the field with the data is permissible may be determined based on the second data tag. For example, the data 112 may include a list of the more specific data tags. While fields may be mapped to the more generic data tags, the processor 102 may determine not to populate the field if the more specific data tag is not included in the data 112, or is otherwise indicated to be invalid.

Figure 2:
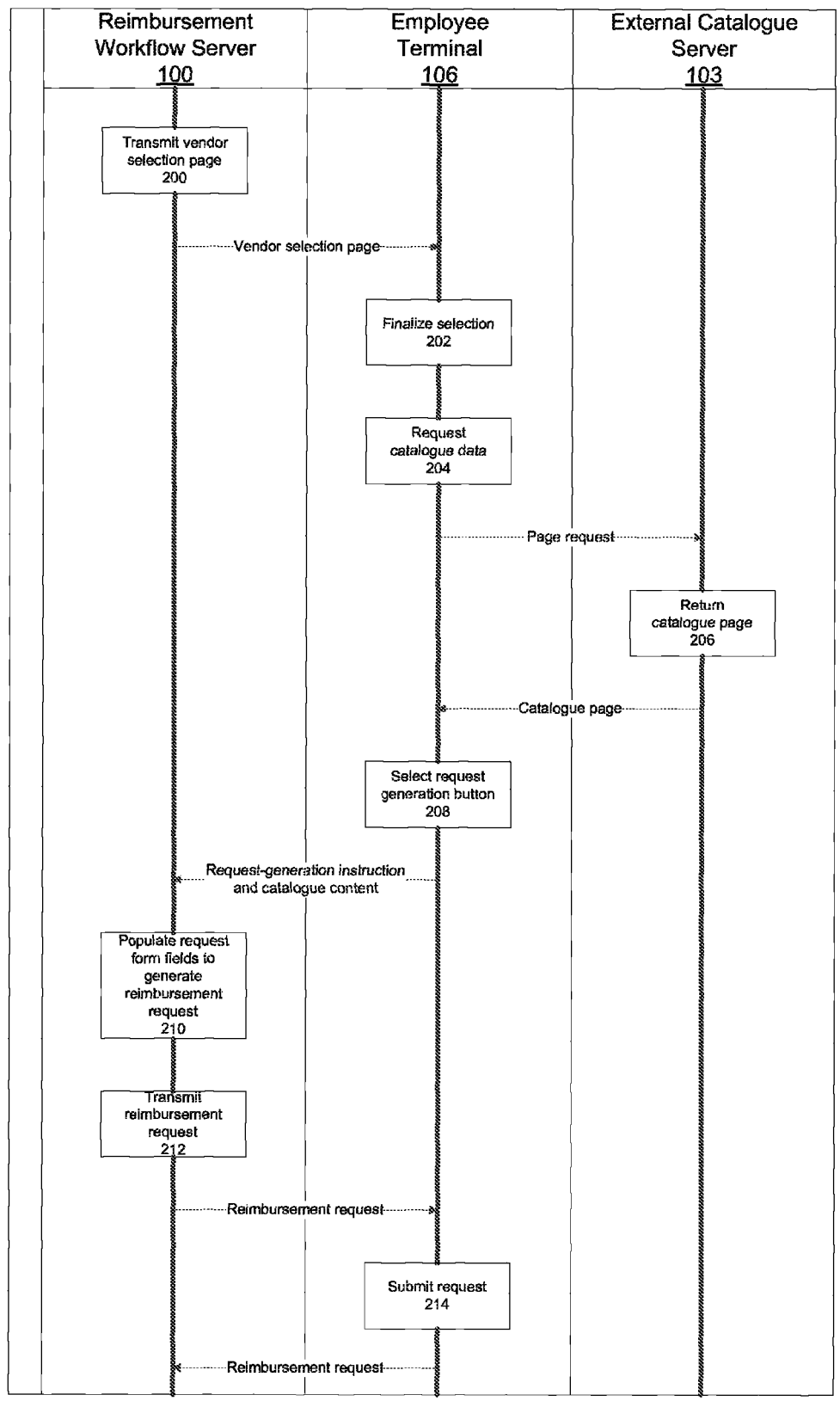
FIG. 2 is a data flow diagram that illustrates an example procedure according to which a reimbursement request may be generated according to an example embodiment of the present invention.
Figure 3:
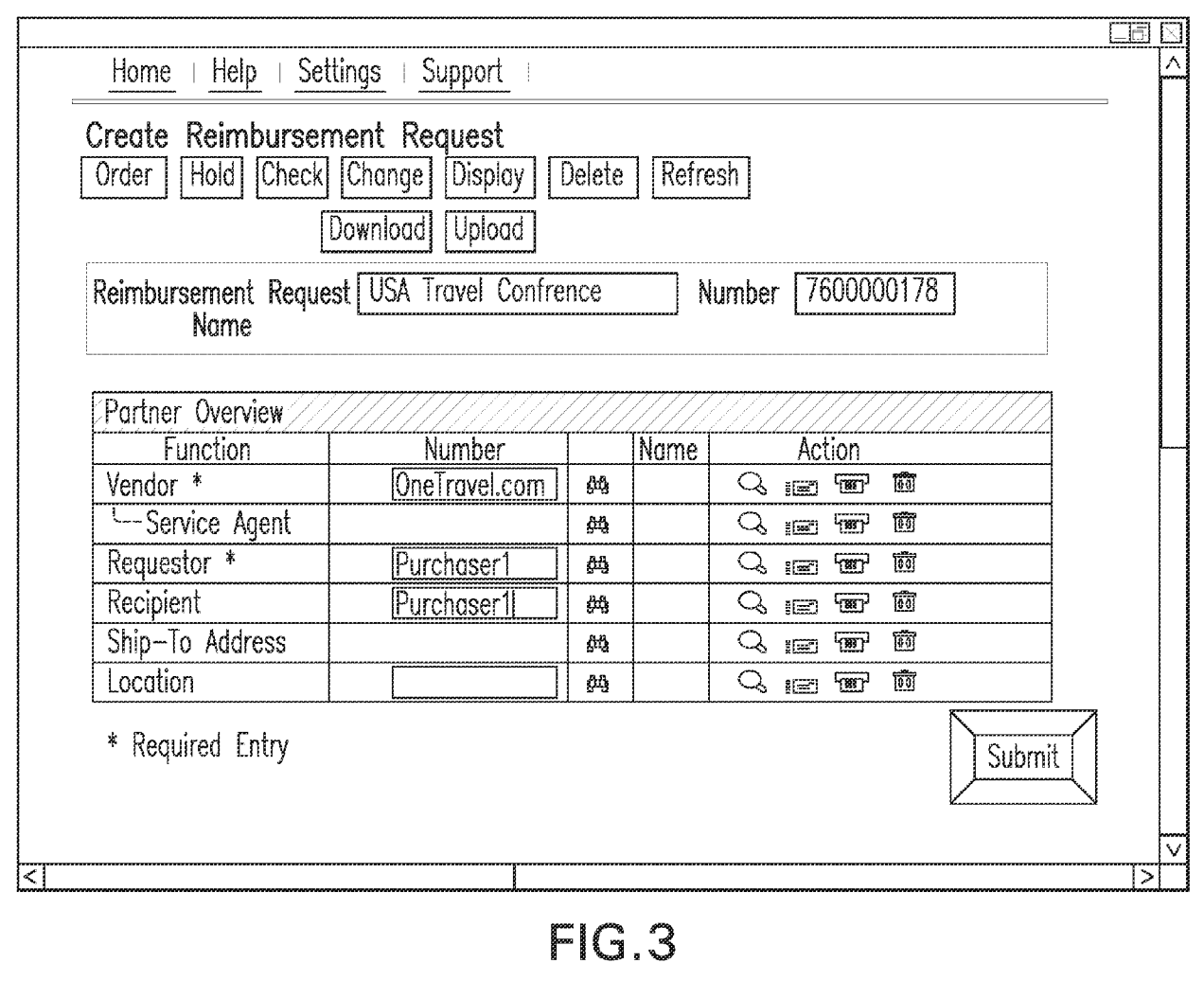

FIG. 2 is a data flow diagram that illustrates an example procedure which may be performed to generate a reimbursement request according to an example embodiment of the present invention. At 200, the server 100 may transmit data to the employee terminal 106 for display of a vendor selection page, for example as shown in FIG. 3. A list of vendors may be provided in the vendor page. For example, a drop-down list box may be provided. Alternatively, a search icon as shown in FIG. 3 may be provided, upon selection of which the server 100 may transmit the list. Alternatively, the list may be embedded in the previously transmitted vendor selection page. The page may include code for displaying the list when the search icon is selected. In one embodiment of the present invention, a vendor field of the vendors selection page may be populated with data identifying an approved vendor identified in the data stored in the memory 104. For example, if the user enters a vendor that is not one of the approved vendors, an error message may be returned. Alternatively, the vendor field may be populated only by selection from the provided list.

At 202, the user may finalize the selection, for example by selecting a submit button. In one embodiment, the vendor selection page may have embedded therein the URLs of the listed vendors. The finalization of the selection may be treated as a selection of the URL, which may instruct a browser application of the terminal 106 to request data from the identified network address, e.g., the external catalogue server 103. For example, for generating a reimbursement request for reimbursement of expenses for purchase of a travel itinerary, the user may select "OneTravel.com" as the vendor. In response to the selection of its URL, the browser may, at 204, request data from the identified external catalogue server 103. At 206, the external catalogue server 103 may return the catalogue page of OneTravel.com for display at the employee terminal 106.

Figure 4A:
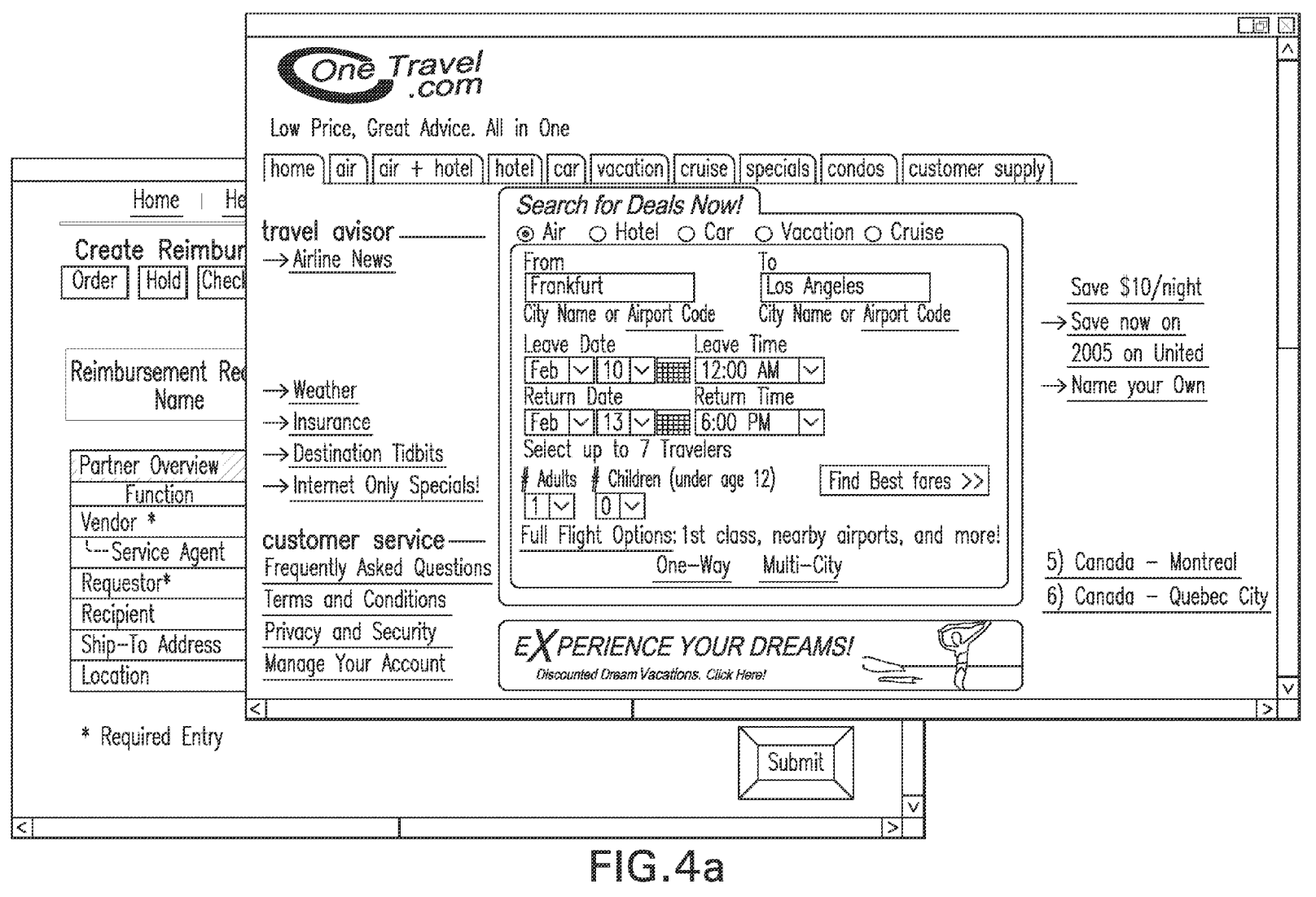

In one embodiment of the present invention, the vendor selection page may be displayed in a first browser window. Code embedded in the vendor selection page may instruct the browser application to open a second window in which a page of the external catalogue may be displayed. For example, such code may be embedded in the catalogue URLs provided in the vendor selection page. When the browser application receives from the external catalogue server the data for display of the catalogue page, the browser application may simultaneously display the first and second windows as shown in FIG. 4a.

Figure 4B:

In an alternative embodiment, the code may instruct the browser application to split the window in which the vendor selection page is displayed into two frames, such that the vendor selection page is displayed in a first frame of the window and the external catalogue page is displayed in a second frame of the same window, as shown in FIG. 4b.

In an embodiment of the present invention, a user may submit a reimbursement request for reimbursement of expenses for the procurement of products and/or services from more than one vendor. For example, a first vendor may provide travel and hotel services, while another vendor may provide for a car rental. In addition, a user may desire to view catalogues of a number of vendors to find a best price or quality for a particular product and/or service. Accordingly, in one embodiment of the present invention, the user may select a plurality of vendors from the vendor selection page, in response to which pages of a plurality of external catalogues may be retrieved. For example, a plurality of windows may be opened, where each window includes a page of a different external catalogue. Alternatively, a single window may be divided into a plurality of frames, where each frame includes a page of a different external catalogue.

The server 100 may provide for display of a button for initiating the extraction of data from the external catalogue page for populating field of a reimbursement request form. For example a "generate reimbursement request" button may be displayed in the vendor selection page, or may be embedded therein for display after the user selects a vendor. Alternatively, code embedded in the vendor selection page may instruct the browser application to provide the "generate reimbursement request" button in the window or frame that is opened for display therein of content of the external catalogue. After the catalogue page is displayed at the terminal 106, the user may browse the catalogue. When the user finds the particular product, service, and/or combination of products and services the user intends to purchase or that the user has already purchased, the user may, at 208, select the request generation button. In response to the button selection, the corresponding instruction and the content of the external catalogue page(s) may be sent to the reimbursement workflow server 100.

At 210, the server processor 102 may generate a reimbursement request 114 by populating fields of a request form template 110 with the external catalogue content. For example, a purchase order request as shown by way of example in FIG. 5 may be generated. In an embodiment of the present invention, if the external catalogue page includes data regarding an unapproved product or service, the unapproved data may be omitted from the generated reimbursement request. For example, the unapproved data may be omitted from the standards data 112, and the processor 102 may therefore be unable to recognize the data. By populating fields of the request form template 110 with only recognized data, the unapproved data may be omitted. In one example embodiment, approval of a particular data item may depend on which vendor is selected. For example, instructions may be provided according to which a processor, e.g., the processor 102, populates a field with data associated with a particular data tag if the data is retrieved from content provided by a first vendor, but not if provided by a second vendor. Alternatively, different sets of standards data 112 may be stored for different vendors.

At 212, the generated reimbursement request may be transmitted to the employee terminal for review. For example, the display of the vendor selection page may be substituted for the display of the generated reimbursement request. If the employee determines that changes should be made, the employee may manually enter those changes. When the employee is satisfied with the generated request, the employee may, at 214, submit the request, e.g., by selecting a submit button on the form.

In an embodiment of the present invention, 212 and 214 may be repeated numerous times for a particular reimbursement request. For example, for the particular reimbursement request, a user, e.g., the author of the request, may access the server 100 to open the request. This may be desirable, for example, where the user determines that changes are required. The user may manually enter the changes. In one embodiment, the user may alternatively, or additionally have fields of the request changed or new fields populated by re-importing content of an opened external catalogue page. For example, the user may select a vendor from the vendor selection page for opening a catalogue of a new vendor or of the vendor that provided the content from which data was previously extracted for populating the previously generated reimbursement request. In one embodiment, 212 and 214 may be repeated until it is indicated that the reimbursement request is to be locked. For example, if a request is generated for reimbursement of expenses incurred during a trip taken by an employee on behalf of the employee's employer, the request may be locked by the employee after the employee returns from the trip and all final changes have been entered. In one example embodiment, the request may be locked automatically after a predetermined time.

After the request is complete and all changes, if any, have been made, it may be determined by the employer, the employer's agent, or automatically whether and to what extent the employee is to be reimbursed.

It will be appreciated that the particular sequence shown in FIG. 2 is presented by way of example only. For example, in an alternative embodiment of the present invention, the reimbursement workflow server 100 may transmit to the employee terminal 106 the request form template 110 and code for populating the template with the content of the external catalogue. In this instance, the generation of the reimbursement request 114 may be performed at the terminal 106, instead of at the server 100. For example, a processor at the employee terminal 106 may generate the request 114 in response to the selection of the request generation button at 208. In one embodiment, the request form template 110 and/or the code for populating the template may be integrated into and displayed as part of the vendor selection page transmitted at 200.

In an embodiment of the present invention, a reimbursement workflow system and a P.O. workflow system may be integrated. A business entity may have numerous departments, where each department performs its assigned task, so that the departments in combination complete a project. An example is where departments may require certain items. The departments may determine what is needed and forward a P.O. request to a purchasing department. The purchasing department may receive numerous P.O. requests, determine the suppliers from which the items are to be ordered, and send P.O.'s to the suppliers requesting the items. In one embodiment, 200-210 may be performed to generate a P.O. request, instead of a reimbursement request.

Figure 6:
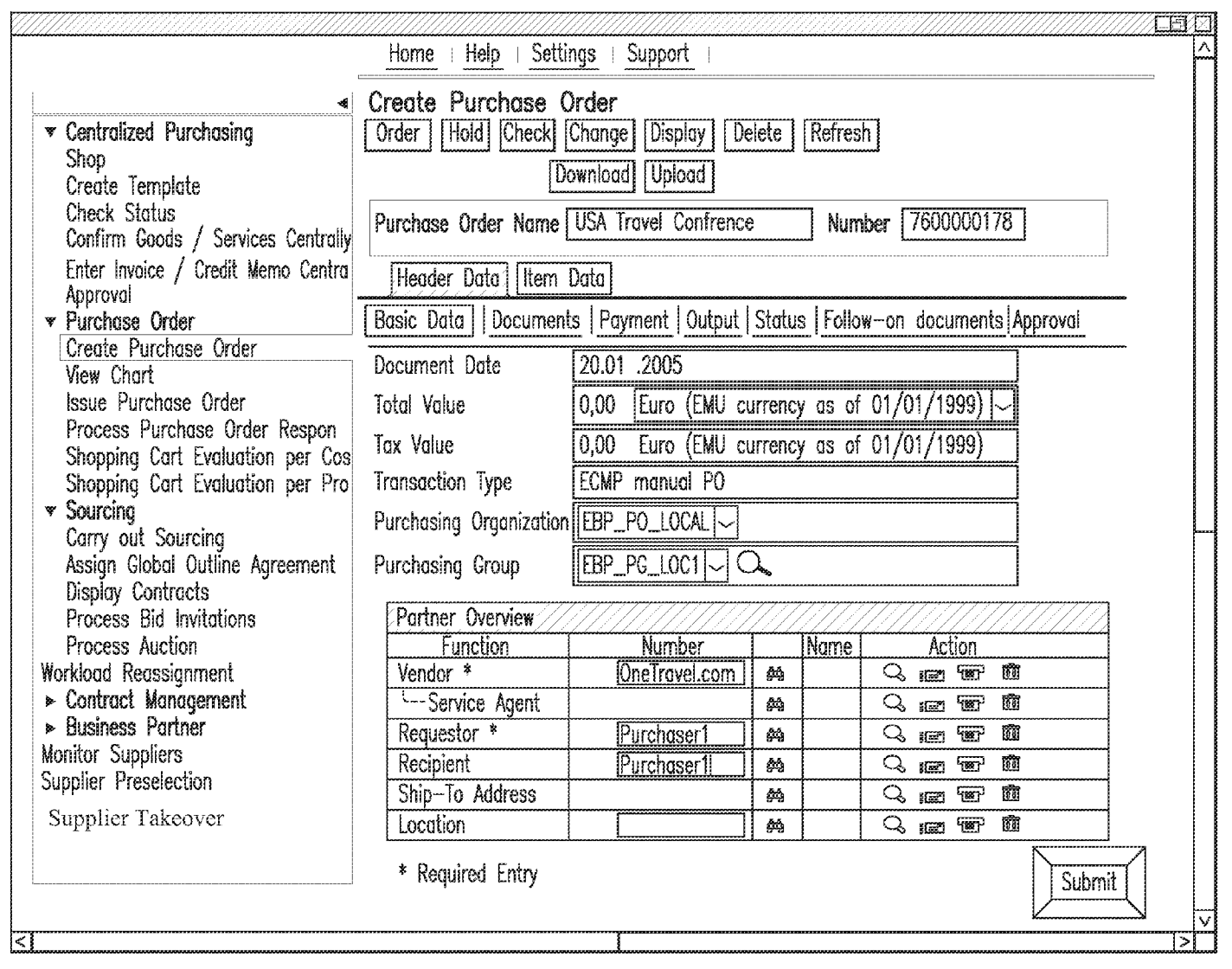

A user who is, for example, of the purchasing department may open stored P.O. requests, including the P.O. request generated in 200-210, in order to generate corresponding P.O.'s. For example, as shown in FIG. 6, the vendor selection page may be displayed for creating a new P.O. request. The user may determine that all or portions of the P.O. request should be handled by the purchasing department and may therefore generate one or more P.O.'s for those determined portions. The user may determine that a different vendor than the proprietor of the external catalogue from data of which the fields of the P.O. request form were populated should be used. Accordingly, the P.O. may be for the different vendor.

The user may determine that all or portions of the P.O. request should be handled by the requestor. The user may therefore have a reimbursement request generated from the P.O. request, or parts thereof, on behalf of the requestor. For example, an employee may generate a P.O. request for an anticipated travel itinerary. This request may include flight, hotel, and car rental purchasing requests. The user may determine that a best strategy is for the purchasing department to purchase the plane ticket, but for the employee to purchase, and be reimbursed for the purchase of, hotel accommodations and the car rental. The user may accordingly have a P.O. generated for purchasing the plane ticket, but may convert the portion of the P.O. request related to the hotel accommodations and car rental into a reimbursement request, which may be stored and accessed in the reimbursement workflow system as more fully set forth above with respect to FIG. 2. To convert the P.O. request into a reimbursement request, a selectable conversion button may be provided, in response to a selection of which the processor 102 may populate fields of a form as shown by way of example in FIG. 5. Alternatively, the processor 102 may copy the P.O. request and store it as a reimbursement request 114. In one example embodiment, if the user determines that only a portion of P.O. request should be converted into a reimbursement request 114, the user may select the determined portion. After selection of the determined portion, the user may select the conversion button. In response to the selection, the processor 102 may generate a reimbursement request 114 that corresponds to the selected portion of the P.O. request. After the P.O. request (or the selected portion thereof) is converted into a reimbursement request, the converted P.O. request (or selected portion thereof) may be deleted from a queue of P.O. requests, since a P.O. is no longer to be generated for the converted P.O. request (or selected portion thereof).

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for generating a reimbursement request in a reimbursement system computer, comprising:

storing a plurality of data tags, including (a) a first set of tags identifying element categories and mapped to fields of a reimbursement request template, and (b) a second set of tags identifying element descriptions;

displaying, by a computer processor of the reimbursement system computer, a page generated based on data obtained from a reimbursement workflow server;

responsive to user-interaction with a first control of the page of the reimbursement workflow server, accessing, by the processor, a first website of a vendor server;

displaying, by the processor, a first page obtained from the vendor server in response to the access of the first website and from which navigation is enabled for generation, in a page of the first website, of a list of at least one of items and services selected for purchase;

responsive to user-interaction with a second control displayed based on the data obtained from the reimbursement workflow server, automatically extracting data from the list;

for a data element of the extracted data:
identifying a data tag that is embedded in the list and that is associated with the data element;
matching the data tag with which the data element is associated with a tag of the stored first set;
mapping the data element to a field of the template based on the mapping of the stored tag with the field of the template; and
determining whether the data element is associated, in the page of the first website including the list of at least one of items and services selected for purchase, with a tag that can be matched to a tag of the stored second set;

conditional upon that the data element is associated, in the page of the first website including the list of at least one of items and services selected for purchase, with a tag that can be matched to a tag of the stored second set, populating a field of a copy of the template corresponding to the mapped field of the template with the extracted data element; and storing the populated copy of the reimbursement request template in a hardware memory device at the reimbursement workflow server.

2. The method of claim 1, wherein:
the first control is a link that is configured to cause, upon its selection, a request for content to be transmitted to the vendor server;
the link is configured to cause, upon its selection, one of a first window and a first frame to be opened for display therein of the first page obtained from the vendor server; and
the method further comprises determining that the extraction is to be from the list based on inclusion of the list in the one of the first window and the first frame.

3. The method of claim 2, wherein:
the page generated based on data obtained from the reimbursement workflow server is displayed in one of:
a second window, the link, upon its selection, causing the first window to be opened; and
a second frame, the link, upon its selection, causing the first frame to be opened, the first and second frames being within a same window; and
the page generated based on data obtained from the reimbursement workflow server includes a plurality of links, including the link to the vendor server, each of the plurality of links being configured to cause, upon its selection, a request for content to be transmitted to a corresponding one of a plurality of external catalogues of one or more vendor servers.

4. The method of claim 3, wherein the second control is displayed in the page generated based on data obtained from the reimbursement workflow server.

5. The method of claim 3, wherein the second control is displayed in the one of the first window and the first frame.

6. The method of claim 3, further comprising:
displaying the copy of the reimbursement request template;
wherein one of:
the copy of the reimbursement request template is displayed in the page generated based on data obtained from the reimbursement workflow server; and
the display of the page generated based on data obtained from the reimbursement workflow server is substituted by the display of the copy of the reimbursement request template.

7. The method of claim 1, wherein:
the first control is a link that is configured to cause, upon its selection, a request for content to be transmitted to the vendor server; and
the link is a Uniform Resource Locator (URL) of the vendor server.

8. The method of claim 1, further comprising:
receiving data input by a user and associated with the populated field; and
responsive to the data input, modifying the populated field, wherein the copy of the reimbursement request template is automatically locked against modification of the populated field after expiration of a predetermined time period.

9. The method of claim 1, wherein:
the populated copy is stored at the reimbursement workflow server in response to a save instruction; and
the method further comprises providing, by the reimbursement workflow server a status of the stored copy indicating whether a reimbursement request of the copy has been granted.

10. The method of claim 9, wherein the status indicates an extent to which the reimbursement request has been granted.

11. The method of claim 1, wherein the extracted data is at least one of a travel booking data, a car rental data, and a hotel accommodations data.

12. The method of claim 1, wherein:
the page including the list further includes a user-selectable control for conducting a transaction via the website for purchase of the at least one of the items and services; and
the method further comprises, responsive to submission of the populated copy of the reimbursement request template, calculating a reimbursement amount based on the data with which the copy of the reimbursement request template was populated.

13. The method of claim 12, wherein the second control is a user-selectable button displayed in the copy of the reimbursement request template, and the user-interaction with the second control is a selection of the user-selectable button.

14. The method of claim 12, further comprising:
displaying the populated copy of the reimbursement request template, the displayed copy being user-modifiable prior to the submission.

15. The method of claim 12, further comprising:
navigating, via the web browser, a second website to a webpage of the second website that lists at least one of items and services selected for purchase;
automatically extracting data from the webpage of the second website; and
populating a field of the template copy based on the data extracted from the webpage of the second website.

16. The method of claim 1, wherein:
the reimbursement request template includes a plurality of templates which differ with respect to at least one of a data type and a data source of data with which the templates are configured to be populated; and
the method further comprises generating the copy of the reimbursement request template by concatenating copies of at least two of the plurality of templates.

17. The method of claim 1, wherein the page generated based on data obtained from the reimbursement workflow server is a vendor selection page that provides selectable links to a plurality of vendors, and the second control is a button displayed in the vendor selection page.

18. The method of claim 1, wherein, for a particular data element associated with a field of the copy of the reimbursement request template, the processor determines whether to populate the associated field with the particular data element depending with which vendor the first page is associated.

19. The method of claim 1, further comprising:
retrieving the stored populated copy of the reimbursement request template; and
subsequently:
automatically extracting data from another list of at least one of items and services selected for purchase; and
modifying the populated copy of the reimbursement request template with the extracted data.

20. A method for generating a reimbursement request in a reimbursement system computer, comprising:
displaying, by a computer processor of the reimbursement system computer, a page generated based on data obtained from a reimbursement workflow server;
responsive to user-interaction with a first control of the page of the reimbursement workflow server, accessing, by the processor, a first website of a vendor server;
displaying, by the processor, a first page obtained from the vendor server in response to the access of the first website and from which navigation is enabled for generation, in a page of the first website, of a list of at least one of items and services selected for purchase;
responsive to user-interaction with a second control displayed based on the data obtained from the reimbursement workflow server, automatically extracting data from the list;
for a data element of the extracted data, identifying a data tag that is embedded in the list and that is associated with the data element;
populating a field of a copy of a reimbursement request template with a portion of the extracted data, wherein, based on the identified data tag, a particular field of the template copy is mapped to, and populated with, the data element;
storing the populated copy of the reimbursement request template in a hardware memory device at the reimbursement workflow server; and
responsive to submission of the populated copy of the reimbursement request template, calculating, by the processor, a reimbursement amount, different percentages greater than zero of costs of a plurality of items indicated in the copy of the reimbursement request template being calculated towards the reimbursement amount for different ones of the plurality of items, the percentages being based on categories with which the items are associated, the categories being determined based on data tags with which the items of the list are associated.

21. The method of claim 20, wherein the particular field is populated with the data element upon a condition that the particular field is associated with the identified data tag.

22. The method of claim 20, further comprising:
populating a field of a copy of a purchase order request template with the extracted data; and
receiving an instruction to convert a portion of the populated copy of the purchase order request template into a reimbursement request;
wherein, for the populating a field of a copy of a reimbursement request template step:
the field is populated in response to the instruction to convert; and
the portion of the extracted data is obtained from the copy of the purchase order request template.

23. The method of claim 22, further comprising:
storing the purchase order request template copy in an electronic purchase order request queue;
wherein the populated copy of the reimbursement request template is stored in association with data indicating an extent to which a reimbursement request represented by the populated template copy has been granted.

24. The method of claim 23, further comprising:
responsive to the conversion request, deleting the purchase order request template copy subsequent to the extraction of the data from the purchase order request template copy.

25. The method of claim 22, wherein, of data obtained from the purchase order request template copy, the fields of the reimbursement request template copy are populated only with data corresponding to a selected portion of the purchase order request template copy, the fields of the reimbursement request template copy not being populated with portions of the extracted data which populate fields of a non-selected portion of the purchase order request.

26. The method of claim 20, wherein:
the page including the list further includes a user-selectable control for conducting a transaction via the website for purchase of the at least one of the items and services; and
the method further comprises:
responsive to submission of the populated copy of the reimbursement request template, calculating a reimbursement amount based on the data with which the copy of the reimbursement request template was populated;
storing a plurality of data tags; and
analyzing a markup of the page including the list to identify the listed at least one of items and services, wherein listed items and services that are not associated, in the page of the first website that lists at least one of items and services, with a data tag that matches any of the plurality of stored data tags are not extracted for population of the copy of the reimbursement request template.

27. The method of claim 20, wherein:
different data elements of the list are associated with different data tags;
a plurality of the data tags are associated with a same category;
a plurality of fields of the template copy are associated with the same category; and
the plurality of fields are populated with the different data elements based on the association of the plurality of fields with the same category.

28. The method of claim 20, further comprising:
storing a plurality of data strings;
mapping the plurality of data strings to one or more fields of the template;
matching a data string of the list displayed in the first page to one of the stored plurality of data strings; and
populating one of the fields of the template copy based on the mapping of the matched data string.

29. A computer-readable storage medium having stored thereon instructions adapted to be executed by a processor, the instructions which, when executed, cause the processor to perform a method, the method comprising:
storing a plurality of data tags, including (a) a first set of tags identifying element categories and mapped to fields of a reimbursement request template, and (b) a second set of tags identifying element descriptions;

displaying, by a computer processor of the reimbursement system computer, a page generated based on data obtained from a reimbursement workflow server;

responsive to user-interaction with a first control of the page of the reimbursement workflow server, accessing, by the processor, a first website of a vendor server;

displaying, by the processor, a first page obtained from the vendor server in response to the access of the first website and from which navigation is enabled for generation, in a page of the first website, of a list of at least one of items and services selected for purchase;

responsive to user-interaction with a second control displayed based on the data obtained from the reimbursement workflow server, automatically extracting data from the list;

for a data element of the extracted data:
  identifying a data tag that is embedded in the list and that is associated with the data element;
  matching the data tag with which the data element is associated with a tag of the stored first set;
  mapping the data element to a field of the template based on the mapping of the stored tag with the field of the template; and
  determining whether the data element is associated, in the page of the first website including the list of at least one of items and services selected for purchase, with a tag that can be matched to a tag of the stored second set;

conditional upon that the data element is associated, in the page of the first website including the list of at least one of items and services selected for purchase, with a tag that can be matched to a tag of the stored second set populating a field of a copy of the template corresponding to the mapped field of the template with the extracted data element; and storing the populated copy of the reimbursement request template in a hardware memory device at the reimbursement workflow server.

30. A method for generating a reimbursement request in a reimbursement system computer, comprising:

displaying, by a computer processor of the reimbursement system computer, a page generated based on data obtained from a reimbursement workflow server;

responsive to user-interaction with a first control of the page of the reimbursement workflow server, accessing, by the processor, a first website of a vendor server;

displaying, by the processor, a first page obtained from the vendor server in response to the access of the first website and from which navigation is enabled for generation, in a page of the first website, of a list of at least one of items and services selected for purchase;

responsive to user-interaction with a second control displayed based on the data obtained from the reimbursement workflow server, automatically extracting data from the list;

for a data element of the extracted data, identifying a data tag that is embedded in the list and that is associated with the data element;

populating a field of a copy of a reimbursement request template with a portion of the extracted data, wherein, based on the identified data tag, a particular field of the template copy is mapped to, and populated with, the data element;

storing the populated copy of the reimbursement request template in a hardware memory device at the reimbursement workflow server; and responsive to submission of the populated copy of the reimbursement request template, calculating, by the processor, a reimbursement amount, different percentages greater than zero of a total cost indicated in the copy of the reimbursement request template being calculated depending on an employee ID with which the copy of the reimbursement request template is associated.

31. A computer-readable storage medium having stored thereon instructions adapted to be executed by a processor, the instructions which, when executed, cause the processor to perform a method for generating a reimbursement request, the method comprising:

displaying, by a computer processor of the reimbursement system computer, a page generated based on data obtained from a reimbursement workflow server;

responsive to user-interaction with a first control of the page of the reimbursement workflow server, accessing, by the processor, a first website of a vendor server;

displaying, by the processor, a first page obtained from the vendor server in response to the access of the first website and from which navigation is enabled for generation, in a page of the first website, of a list of at least one of items and services selected for purchase;

responsive to user-interaction with a second control displayed based on the data obtained from the reimbursement workflow server, automatically extracting data from the list;

for a data element of the extracted data, identifying a data tag that is embedded in the list and that is associated with the data element;

populating a field of a copy of a reimbursement request template with a portion of the extracted data, wherein, based on the identified data tag, a particular field of the template copy is mapped to, and populated with, the data element;

storing the populated copy of the reimbursement request template in a hardware memory device at the reimbursement workflow server; and responsive to submission of the populated copy of the reimbursement request template, calculating, by the processor, a reimbursement amount, different percentages greater than zero of a total cost indicated in the copy of the reimbursement request template being calculated depending on an employee ID with which the copy of the reimbursement request template is associated.

32. A computer-readable storage medium having stored thereon instructions adapted to be executed by a processor, the instructions which, when executed, cause the processor to perform a method for generating a reimbursement request, the method comprising:

displaying, by a computer processor of the reimbursement system computer, a page generated based on data obtained from a reimbursement workflow server;

responsive to user-interaction with a first control of the page of the reimbursement workflow server, accessing, by the processor, a first website of a vendor server;

displaying, by the processor, a first page obtained from the vendor server in response to the access of the first website and from which navigation is enabled for generation, in a page of the first website, of a list of at least one of items and services selected for purchase;

responsive to user-interaction with a second control displayed based on the data obtained from the reimbursement workflow server, automatically extracting data from the list;

for a data element of the extracted data, identifying a data tag that is embedded in the list and that is associated with the data element;

populating a field of a copy of a reimbursement request template with a portion of the extracted data, wherein, based on the identified data tag, a particular field of the template copy is mapped to, and populated with, the data element;

storing the populated copy of the reimbursement request template in a hardware memory device at the reimbursement workflow server; and responsive to submission of the populated copy of the reimbursement request template, calculating, by the processor, a reimbursement amount, different percentages greater than zero of costs of a plurality of items indicated in the copy of the reimbursement request template being calculated towards the reimbursement amount for different ones of the plurality of items, the percentages being based on categories with which the items are associated, the categories being determined based on data tags with which the items of the list are associated.

33. A system for generating a reimbursement request, comprising:

a storage device storing a plurality of data tags, including (a) a first set of tags identifying element categories and mapped to fields of a reimbursement request template, and (b) a second set of tags identifying element descriptions;

a display device; and a computer processor configured to:

display in the display device a page generated based on data obtained from a reimbursement workflow server;

responsive to user-interaction with a first control of the page of the reimbursement workflow server, access a first website of a vendor server;

display in the display device a first page obtained from the vendor server in response to the access of the first website and from which navigation is enabled for generation, in a page of the first website, of a list of at least one of items and services selected for purchase;

responsive to user-interaction with a second control displayed based on the data obtained from the reimbursement workflow server, automatically extract data from the list;

for a data element of the extracted data:

identify a data tag that is embedded in the list and that is associated with the data element;

match the data tag with which the data element is associated with a tag of the stored first set;

map the data element to a field of the template based on the mapping of the stored tag with the field of the template; and determine whether the data element is associated, in the page of the first website including the list of at least one of items and services selected for purchase, with a tag that can be matched to a tag of the stored second set;

conditional upon that the data element is associated, in the page of the first website including the list of at least one of items and services selected for purchase, with a tag that can be matched to a tag of the stored second set, populate a field of a copy of the template corresponding to the mapped field of the template with the extracted data element; and store the populated copy of the reimbursement request template in a memory device at the reimbursement workflow server.

\* \* \* \* \*